(12) United States Patent
Care et al.

(10) Patent No.: US 8,684,602 B2
(45) Date of Patent: Apr. 1, 2014

(54) BEARING ASSEMBLY

(75) Inventors: Ian C. D. Care, Derby (GB); Seamus Garvey, Nottingham (GB); Shakir Jiffri, Kandy (LK)

(73) Assignee: Rolls-Royce PLC, London (GB)

( * ) Notice: Subject to any disclaimer, the term of this patent is extended or adjusted under 35 U.S.C. 154(b) by 249 days.

(21) Appl. No.: 12/967,495

(22) Filed: Dec. 14, 2010

(65) Prior Publication Data

US 2011/0150372 A1 Jun. 23, 2011

(30) Foreign Application Priority Data

Dec. 21, 2009 (GB) .................................. 0922187.0

(51) Int. Cl.
*F16C 32/00* (2006.01)
*F16F 9/32* (2006.01)

(52) U.S. Cl.
USPC .......................................... 384/1; 188/266.7

(58) Field of Classification Search
USPC .................. 384/1, 517, 563; 188/266, 266.7; 267/140.14, 140.15; 310/323.01, 310/323.02, 323.13, 323.14
See application file for complete search history.

(56) References Cited

U.S. PATENT DOCUMENTS

| | | | | |
|---|---|---|---|---|
| 4,630,941 A | * | 12/1986 | Chainer et al. | 384/1 |
| 5,145,259 A | * | 9/1992 | Murano et al. | 384/1 |
| 5,201,586 A | * | 4/1993 | Zimmermann et al. | 384/247 |
| 5,221,146 A | | 6/1993 | Maruyama | |
| 6,012,333 A | * | 1/2000 | Urushiyama et al. | 73/579 |
| 6,170,987 B1 | * | 1/2001 | Huang et al. | 384/99 |
| 6,190,052 B1 | * | 2/2001 | Schnur et al. | 384/519 |
| 6,394,655 B1 | | 5/2002 | Schnur et al. | |
| 7,312,559 B2 | * | 12/2007 | Lee et al. | 310/367 |
| 7,475,761 B2 | * | 1/2009 | Fischer | 188/266.7 |
| 2004/0231337 A1 | * | 11/2004 | Jakadofsky | 60/793 |
| 2011/0150378 A1 | * | 6/2011 | Care et al. | 384/438 |

FOREIGN PATENT DOCUMENTS

| | | |
|---|---|---|
| DE | 10 2004 024 851 A1 | 12/2005 |
| EP | 2 060 810 A1 | 5/2009 |
| JP | A-04-165118 | 6/1992 |
| JP | A-2007-38820 | 2/2007 |
| JP | A-2008-138704 | 6/2008 |

OTHER PUBLICATIONS

Translation of JP 4-165118 A.*
British Search Report dated Apr. 7, 2010 in British Patent Application No. GB0922187.0.
Search Report issued in European Application No. EP 10 19 4830 dated Apr. 7, 2011.

* cited by examiner

*Primary Examiner* — Marcus Charles
*Assistant Examiner* — Adam D Rogers
(74) *Attorney, Agent, or Firm* — Oliff PLC

(57) ABSTRACT

The present invention relates to a bearing assembly (1) for a rotatable shaft (2). The bearing assembly comprises a bearing housing (10); a bearing (20) located within the bearing housing (10) and arranged in use to receive a rotatable shaft (2); and an elongate member (14) that couples the bearing (20) to the bearing housing (10) for damping vibrations of the rotatable shaft (2). The elongate member (14) comprises a piezoelectric element (40) which may be actuated so as to exert a force on the elongate member. This arrangement allows the bearing assembly to damp vibrations of the rotatable shaft.

8 Claims, 10 Drawing Sheets

BEARING ASSEMBLY

BACKGROUND

The present invention relates to a bearing assembly, in particular, a bearing assembly comprising a damper.

In gas turbine engines it is necessary to control the vibrations of the rotor in order to reduce the vibrations transmitted to the housing. This is especially important in the case of gas turbine engines for jet engines where it is necessary to reduce the vibrations transmitted to the aircraft structure.

With reference to FIG. 1, in one previously considered arrangement 100 the vibrations of the rotor shaft 108 are controlled by providing a squeeze film damper (SFD) 106 in between the bearing 102 and the bearing housing 104. The squeeze film is a small oil-filled clearance between the bearing 102 and the bearing housing. The oil film damps the radial motion of the rotating assembly and the dynamic loads transmitted to the bearing housing, thereby reducing the vibration level of the engine. Squeeze film dampers are very effective in reducing the moderate vibration that is still present after the rotor has been balanced.

SUMMARY

However, squeeze film dampers are passive because the damping force that they exert remains constant. This means that they are designed as a compromise for a range of conditions. The performance of squeeze film dampers can also be affected by the temperature of the oil, the pressure of the oil, the age and condition of the oil, and the thermal expansion of the bearing and bearing housing. All of these parameters vary during operation of the gas turbine engine which result in squeeze film dampers not controlling the vibration of the rotor sufficiently under all conditions.

In accordance with an exemplary embodiment, bearing assembly for a rotatable shaft includes a bearing housing and a bearing located within the bearing housing and arranged in use to receive a rotatable shaft. The assembly further includes a plurality of elongate members that couple the bearing to the bearing housing. The elongate members extend at least partially in the axial direction of the rotatable shaft. The elongate members include piezoelectric elements which may be actuated so as to exert forces on the elongate members, thereby changing the stiffness of the elongate members or causing the elongate members to undergo bending to reduce vibration transmitted from the bearing assembly.

The invention may comprise any combination of the features and/or limitations referred to herein, except combinations of such features as are mutually exclusive.

BRIEF DESCRIPTION OF THE DRAWINGS

Embodiments of the present invention will now be described, by way of example only, with reference to the accompanying drawings, in which.

DETAILED DESCRIPTION OF THE EMBODIMENTS

Figure 1:
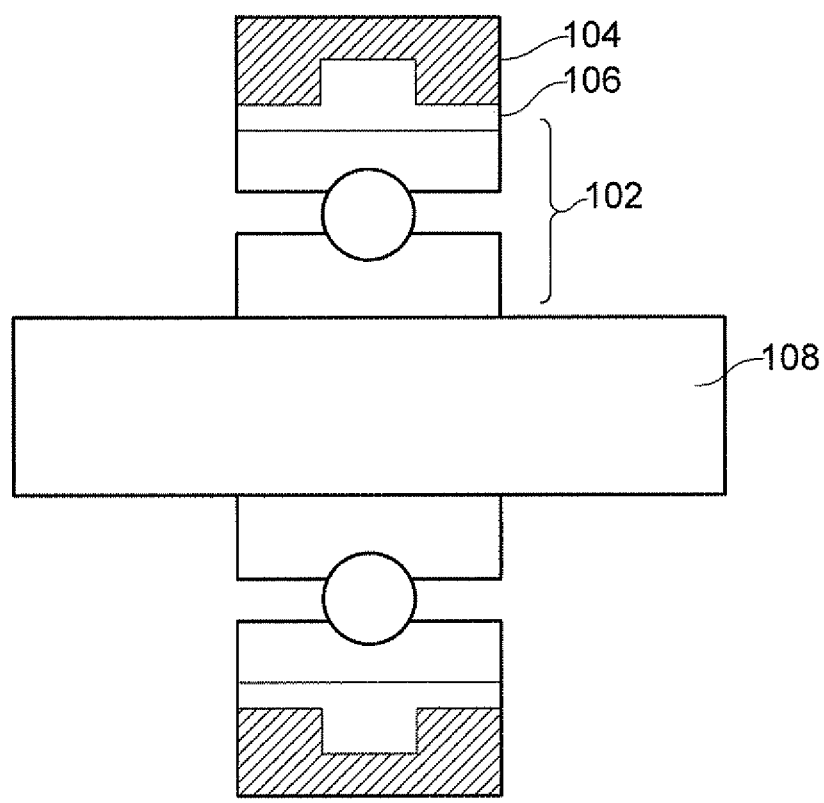
FIG. 1 schematically shows a previously considered bearing and damper arrangement.
Figure 2:
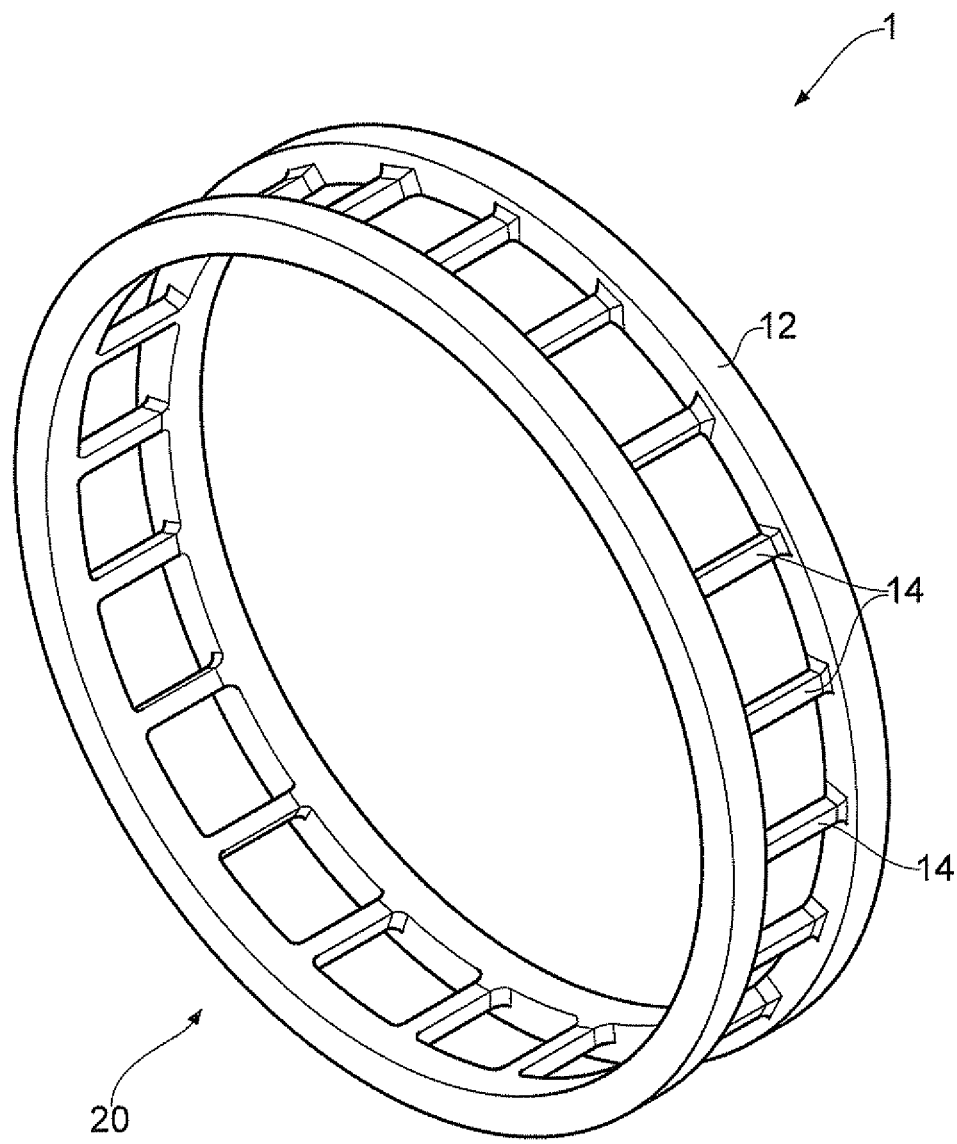
FIG. 2 schematically shows a perspective view of a cage bearing assembly according to the present invention.
Figure 3:
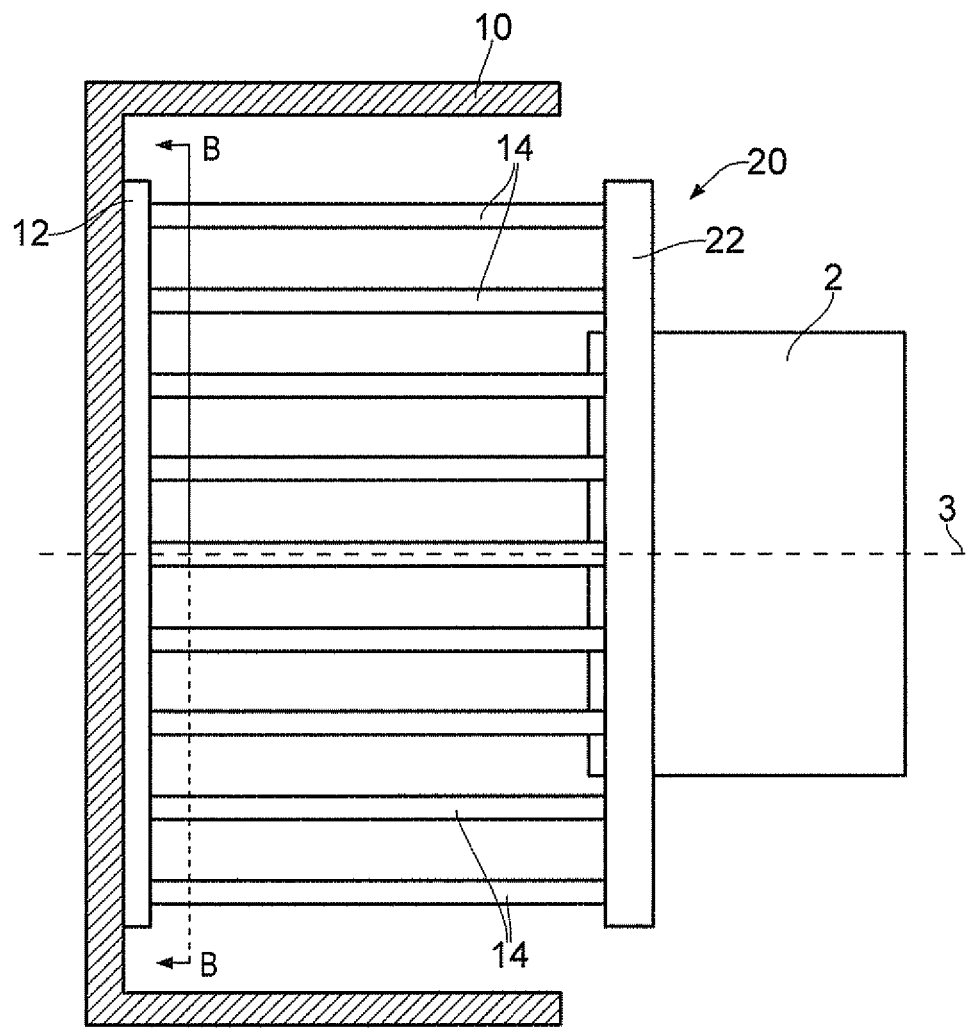
FIG. 3 schematically shows a side view of a bearing assembly according to the present invention.

Referring to FIGS. 2 and 3 a bearing assembly 1 for a rotatable shaft 2 according to the present invention comprises a bearing housing 10 having a bearing 20 located within it. The bearing 20 is attached to the bearing housing 10 by an annular flange 12, acting as a mounting portion. The annular flange 12 is connected to the bearing 20 by a plurality of elongate members 14 in the form of webs. The elongate members 14 are flexible in bending.

Figure 4:
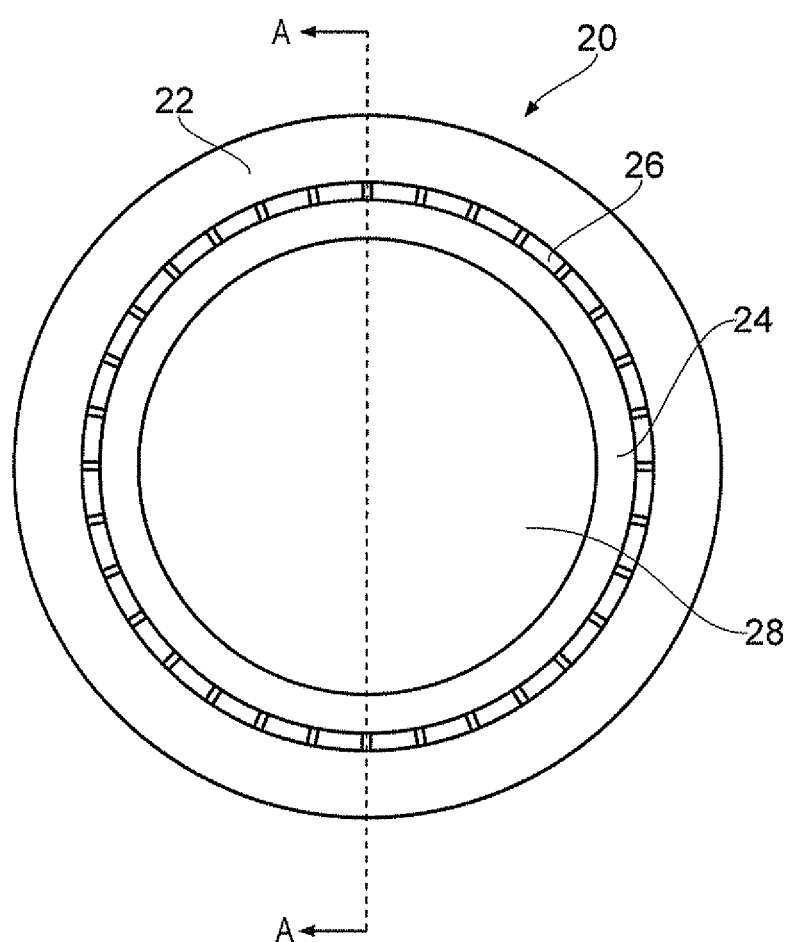
FIG. 4 schematically shows a front view of the bearing assembly of FIGS. 2 and 3.
Figure 5:
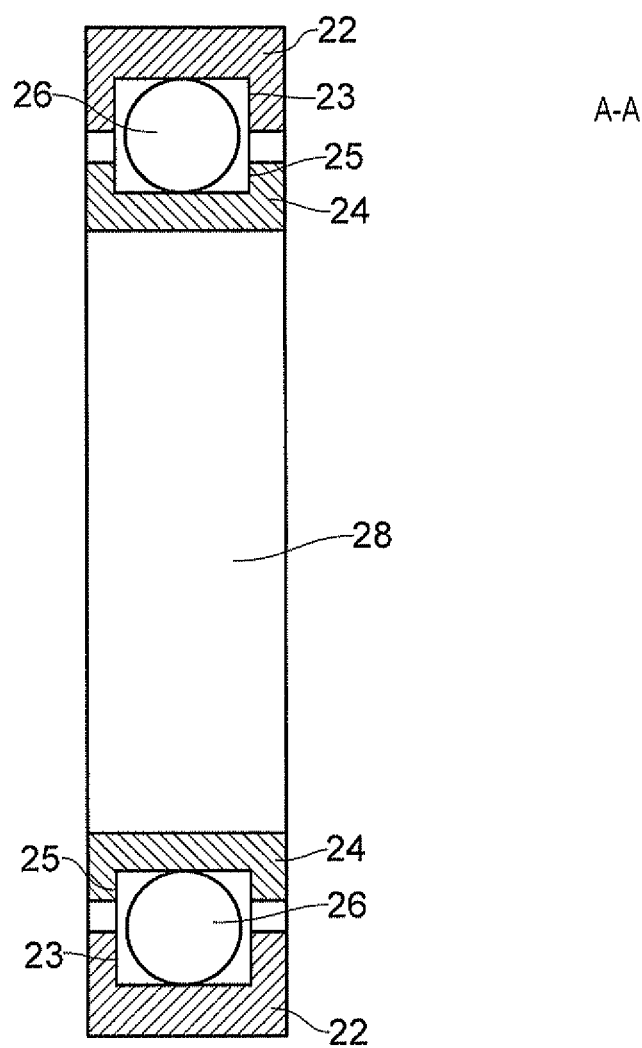
FIG. 5 schematically shows the cross-section A-A of FIG. 4.

FIGS. 4 and 5 show the bearing 20 alone. In this embodiment the bearing 20 is a ball bearing comprising an outer race 22 and an inner race 24. The outer race 22 comprises an annular groove 23 on the inner surface and the inner race 24 comprises an annular groove 25 on the outer surface. A ring of balls 26 is located between the outer race 22 and the inner race 24 and sits within the respective grooves 23, 25. The inner race 24 can therefore rotate with respect to the outer race 22. The inner race 24 comprises an axial opening 28 within which the rotatable shaft 2 can be located. This allows the rotatable shaft 2 to rotate freely with respect to the outer race 22. The elongate members 14 that attach the flange 12 to the bearing 20 are attached to the outer race 22 and therefore the rotatable shaft 2 can rotate freely with respect to the flange 12. As will be readily apparent to one skilled in the art, other types of bearings such as roller bearings may be used.

Figure 6:
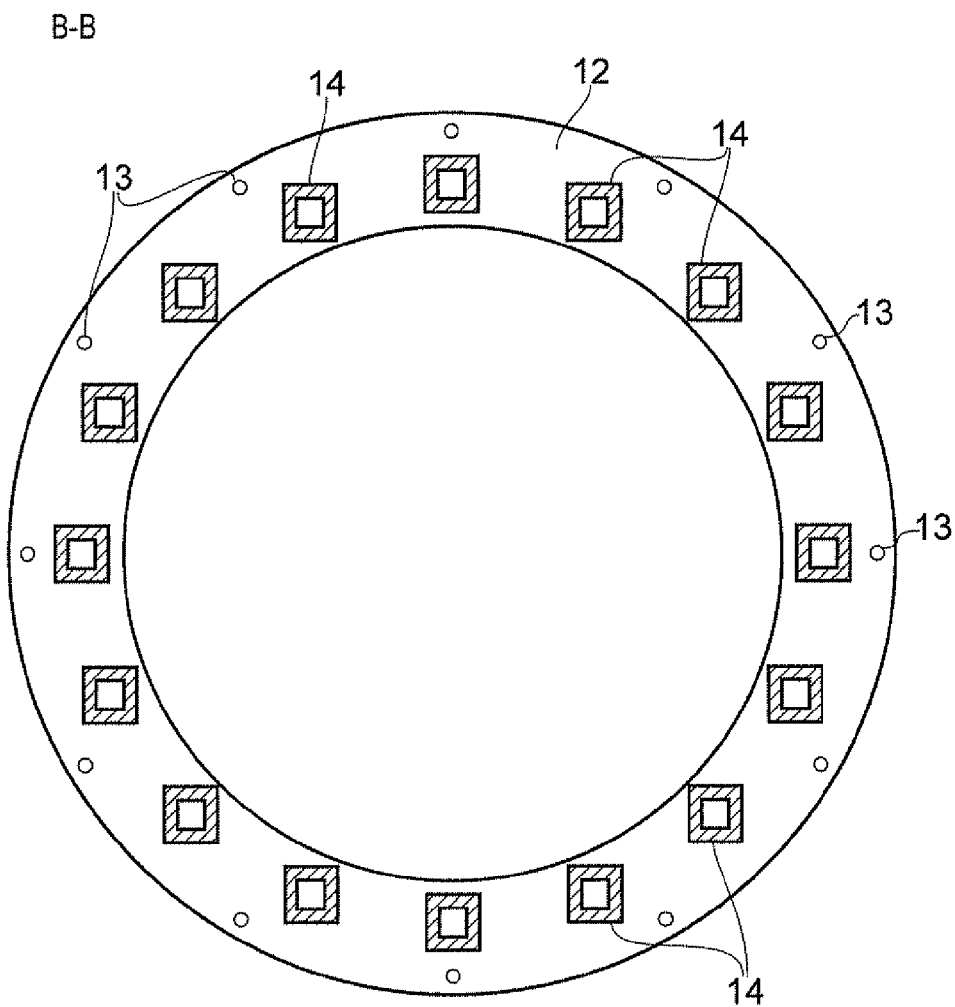
FIG. 6 schematically shows the cross-section B-B of FIG. 3.

As shown in FIG. 6, the flange 12 comprises a plurality of mounting holes 13 for attaching the bearing 20 to the bearing housing 10. The elongate members 14 are hollow and have a generally square cross-section. Each elongate member 14 is welded at a first end to the flange 12 and at a second end to the bearing 20. The elongate members 14 extend in the axial direction 3 of the rotatable shaft 2 which in use the bearing 20 supports. The elongate members 14 are evenly spaced around the circumference of the flange 12 and the outer race 22 and are orientated such that their sides are parallel.

Figure 7A:
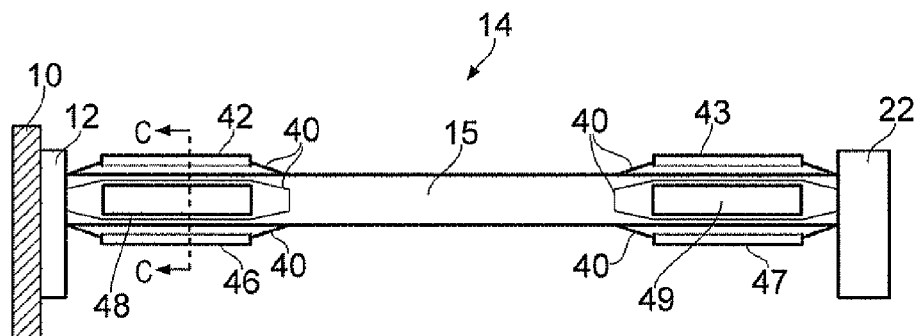
FIGS. 7A and 7B schematically show an enlarged view of an individual elongate member.

FIG. 7A shows an enlarged view of a elongate member 14 that connects the flange 12 to the outer race 22 of the bearing 20. Each elongate member 14 comprises an elongate web 15 and each end of the elongate web 15 comprises piezoelectric elements 40 on the outer surfaces. The edges of the piezoelectric elements 40 are chamfered in order to avoid stress concentrations at their edges.

Figure 7B:
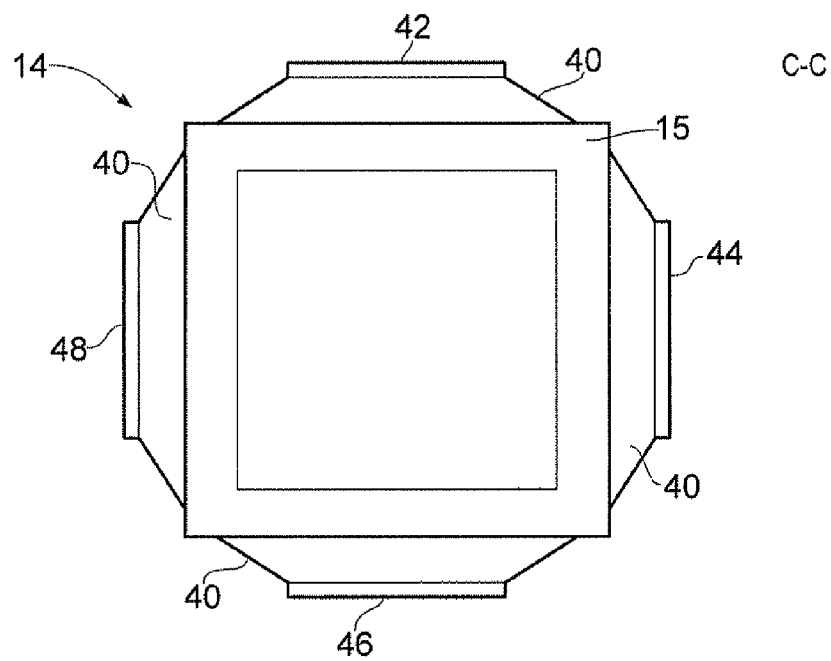

As shown in FIG. 7B, a piezoelectric element 40 is bonded to each of the sides of the web 15. In this embodiment, each elongate member 14 comprises a piezoelectric element 40 bonded to each side of each end the web 15. However, other arrangements may be possible such as applying piezoelectric elements 40 to alternate webs 15, for example.

Each of the piezoelectric elements 40 at the first end of the web 15 is provided with an electrode 42, 44, 46, 48. Similarly, each of the piezoelectric elements 40 at the second end of the web 15 is provided with an electrode 43, 45, 47, 49. Each of the electrodes 42-49 is connected to a separate control circuit (not shown). However, corresponding electrodes (e.g. the upper electrodes 42 of the first end of the web of all of the elongate members 14) are connected to the same control circuit. This makes activation simple, as will be discussed below.

When a voltage is applied to the piezoelectric elements 40 by the electrodes 42, 44, 46, 48 a strain is induced in the piezoelectric elements 40. This causes them to exert a force on the web 15. Since the upper side, first side, second side and lower side electrodes 42, 44 46, 48 are coupled to different control circuits they can be controlled individually. For example, the piezoelectric element 40 on the upper surface can be controlled to generate a tensile force on the upper surface of the web 15, and the piezoelectric element 40 on the lower surface can be controlled to generate a compressive force on the lower surface of the web 15. This would tend to cause the elongate member 14 to undergo bending.

Figure 8:
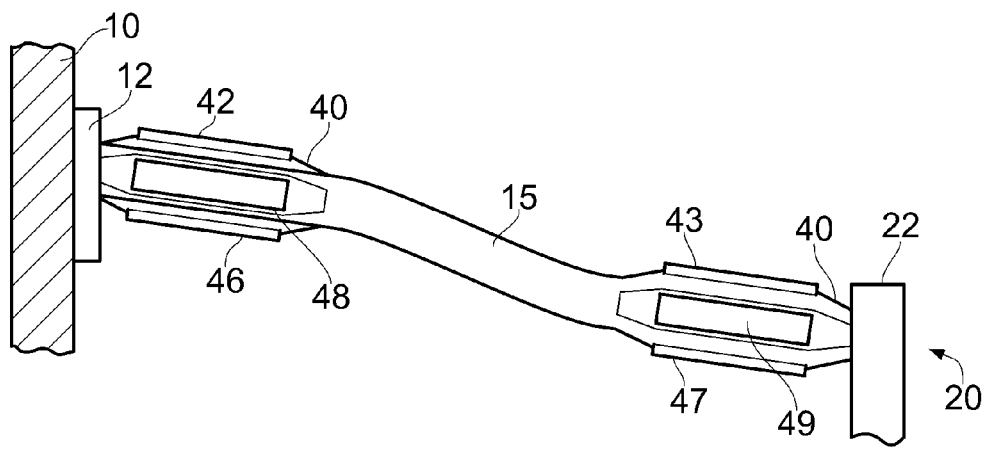
FIG. 8 schematically shows a deflected view of the elongate member of FIG. 7.

It will be appreciated that because the piezoelectric elements on the upper and lower sides and on the first and second sides are mutually perpendicular, forces can be generated in two independent directions.

Where an unbalanced load is applied to the shaft, this puts an out of balance force on the bearing, which deflects the bearing with respect to the housing, so an elongate member may be deflected as shown (in an exaggerated form) in FIG. 8. By applying the appropriate voltages to the electrodes 42-49, the elongate member 14 adapts to counteract the deflection and reduce the vibration transmitted to the rest of the structure via the bearing housing.

In use, and as shown in FIG. 3, a rotatable shaft 2 is located within the opening 28 of the bearing 20. The vibrations of the rotatable shaft 2 are damped by the bearing assembly 1. When the rotatable shaft 2 vibrates, the elongate members 14, comprising the webs 15 and the piezoelectric elements 40, deflect. The axial centre of the elongate member 14 undergoes little, if any bending, and for this reason piezoelectric elements 40 are only attached to the ends of the web 15. In order to minimise the vibrations transmitted from the rotatable shaft 2 to the engine housing forces are applied to the elongate members 14 by applying suitable voltages to the piezoelectric elements 40 via the electrodes 42-49.

In one embodiment the webs 15 are placed into tension before the piezoelectric elements 40 are attached. This means that the piezoelectric elements 40 are under compression, which gives an advantage as the piezoelectric elements already act to stiffen the structure.

Another useful attribute of this configuration is its ability to function as a fail-safe passive elongate member. If the control circuits coupled to the electrodes 41-49 fail, all of the electrodes can be short-circuited to a load resistor and the current produced as a result of the deformation of the elongate members 14 can be dissipated through the resistor, thus providing some damping.

In a further arrangement the fatigue life of the piezoelectric elements 40 can be increased. This is done by applying a compressive pre-load to them prior to their attachment to the webs 15. This may be achieved by bending the webs 15 before attaching the piezoelectric elements 40.

In alternative embodiments of the invention, the elongate members 14 may have a different cross-sectional shape (for example, circular, oval or hexagonal). They may be solid, though hollow webs are likely to provide the most weight efficient solution. A further advantage of hollow webs is that they will have a low transverse stiffness coupled with relatively high strains at their surfaces, so that the piezoelectric elements can deform them effectively when actuated. The elongate members 14 are described as being welded to the flange 12, but may of course be joined by any suitable means.

If there is a natural bias in the forces on the bearings, then this may be compensated for by spacing the elongate members unevenly around the circumference of the bearing. Alternatively or additionally, the elongate members in different positions may have different properties (for example, diameter, thickness, strength or stiffness) to compensate for this natural bias. This ensures that during running, the offset loads will be evenly damped.

Figure 9:
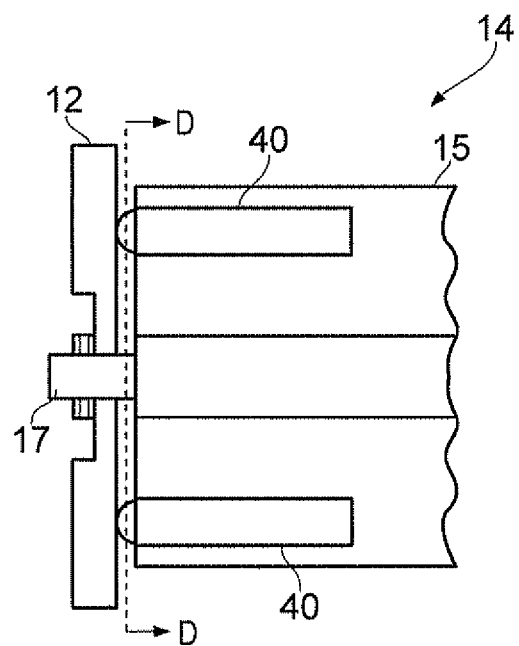
FIG. 9 schematically shows an enlarged view of a elongate member according to a second embodiment of the present invention.
Figure 9:
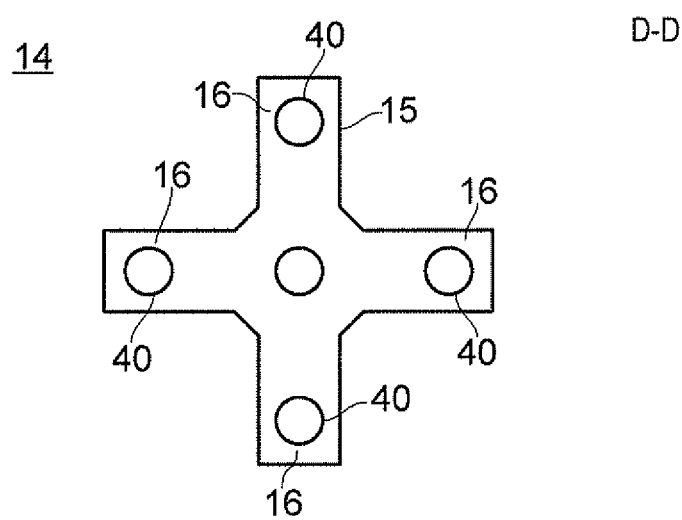

Turning to FIG. 9, a second embodiment is illustrated which is of a similar arrangement to the first embodiment shown in FIGS. 6 and 7. However, the elongate members 14 are of a different configuration. Each of the elongate members 14 comprises a web 15 and four piezoelectric elements 40. The web 15 has a cruciform cross-section and comprises four axially extending recesses 16 within which are located the piezoelectric elements 40. Each of the piezoelectric elements 40 protrudes from its respective recess. Each of the piezoelectric elements 40 is provided with an electrode that is coupled to a control circuit (not shown). As for the first embodiment, the elongate members 14 are evenly spaced around the circumference of the flange 12 and the outer race 22 and are orientated such that their sides are parallel. This allows simple actuation.

The elongate members 14 are attached at a first end to the flange 12 by using a pin 17 through a hole in the flange. Since the piezoelectric elements 40 protrude from the end of the web 15 they are in contact with the surface of the flange 12. The piezoelectric elements 40 are pre-loaded in compression by tightening the elongate member 14 towards the flange, thus exerting a force on the piezoelectric elements 40. A small distance is left between the end of the web 15 and the flange 12. The pin 17 connection between the elongate member 14 and the flange 12 is a diaphragm-type connection and allows flexibility in both the axial and bending directions. The diaphragm-type connection is achieved by thinning the flange 12 in the region of the pin connection.

In use, a voltage applied to the piezoelectric elements 40 causes them to contract or expand in the axial direction. This exerts a force on the flange 12. In order to alter the damping of the bearing assembly 1, the piezoelectric elements 40 of a single elongate member 14 can be controlled independently to cause the elongate member 14 to bend. For example, if the upper piezoelectric element 40 is caused to expand, and the lower piezoelectric element 40 is caused to contract, the elongate member 14 will bend in a downwards direction. If all of the elongate members 14 are actuated in this way then vibrational forces of the rotatable shaft 2 can be controlled. Of course the elongate members 14 can be caused to bend in any direction depending on the voltages applied to the piezoelectric elements 40. By arranging that all of the elongate members 14 have the same orientation, and coupling corresponding electrodes to the same control circuit, easy actuation of the assembly can be ensured. This means that only four control circuits are required for the elongate member assembly as opposed to one for each piezoelectric element 40.

Figure 10:
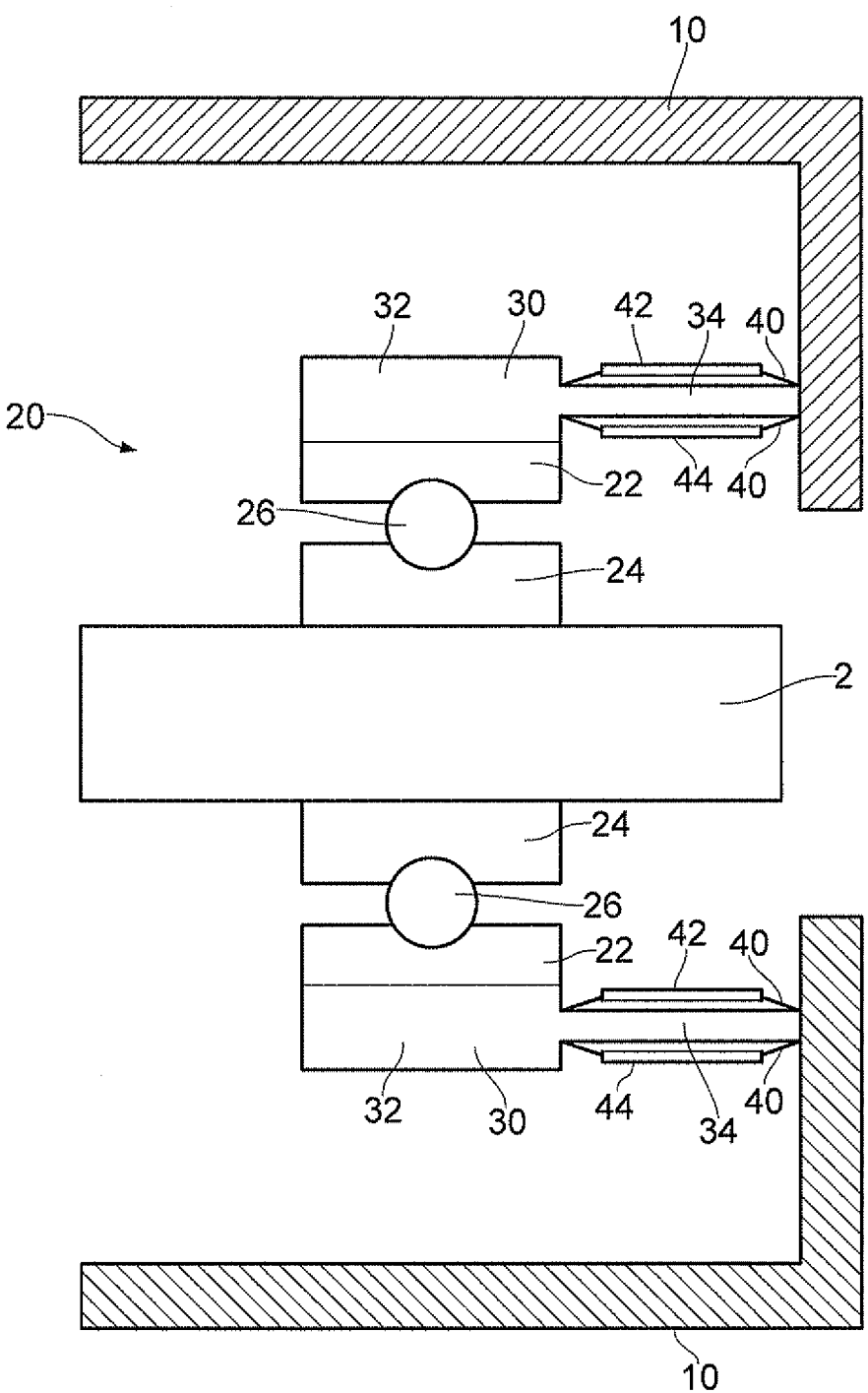
FIG. 10 schematically shows a bearing assembly according to a third embodiment of the present invention.

A third embodiment of the present invention is shown in FIG. 10. In this embodiment the ball bearing 20 is coupled to the bearing housing 10 by a elongate member assembly 30. The elongate member assembly 30 comprises a bearing abutment portion 32 and a spring portion 34. The bearing abutment portion 32 is attached to the outer race 22 of the bearing 20 and the spring portion 34 is attached to the bearing housing 10. A piezoelectric element 40 is bonded to the upper and lower surfaces of the spring portion 34. The piezoelectric elements 40 are provided with upper and lower electrodes 42, 44 which are coupled to control circuits (not shown).

The stiffness of the spring portion 34 can be altered by varying the voltages applied to the piezoelectric elements 40 by the electrodes 42, 44. Vibration can then be controlled by suitably changing the stiffness of the elongate members.

The elongate member assembly 30 may be a continuous annular assembly extending around the entire circumference of the bearing 20, or it may comprise a plurality of discrete elongate members spaced around the circumference. In the latter case, the elongate members would generally be symmetrically spaced around the bearing 20.

Although the embodiments described herein have referred to a ball bearing, it will be appreciated that the invention is equally applicable to other types of bearing, for example roller bearings or needle bearings.

It will be appreciated that, although the operation of the invention has been described in the context of reducing vibration transmitted from a bearing assembly, the flexibility of control and speed of actuation afforded by the piezoelectric elements enables much more subtle control of the bearing assembly's behaviour. In particular, it is possible to actuate the piezoelectric elements to shift the rotational centre of the bearing, perhaps to compensate for out-of-balance forces arising elsewhere in the machine. It would also be possible to actuate the piezoelectric elements transiently to inject a test signal into the bearing assembly, so that its response to a perturbation can be measured.

The invention claimed is:

1. A bearing assembly for a rotatable shaft, comprising:
   a bearing housing;
   a bearing located within the bearing housing and arranged in use to receive the rotatable shaft; and
   a plurality of elongate members that couple the bearing to the bearing housing,
   the elongate members extending at least partially in an axial direction of the rotatable shaft;
   wherein the elongate members include piezoelectric elements configured upon actuation to directly exert forces on the elongate members, thereby changing the stiffness of the elongate members or causing the elongate members to undergo bending to reduce vibration transmitted from the bearing assembly:
   wherein each elongate member has axially extending sides, and the elongate members are oriented such that each side of each elongate member is parallel to a corresponding side of an adjacent elongate member; and
   wherein each of the plurality of elongate members has one of the piezoelectric elements attached on each side.

2. A bearing assembly according to claim 1, wherein the elongate member comprises a web having the piezoelectric element attached thereto.

3. A bearing assembly according to claim 2, wherein the piezoelectric elements are attached to the web at a first end and a second opposing end.

4. A bearing assembly according to claim 1, further comprising a mounting portion that couples the plurality of elongate members to the bearing housing.

5. A bearing assembly according to claim 1, wherein each of the plurality of elongate members has a generally square cross section and four sides of the plurality of elongate members are parallel to one another; and each of the plurality of elongate members has one of the piezoelectric elements attached on each of its four sides.

6. A bearing assembly according to claim 1, wherein the plurality of elongate members are circumferentially arranged around the axis of the rotatable shaft.

7. A gas turbine engine comprising a bearing assembly according to claim 1.

8. A method of exerting a force on a plurality of elongate members of a bearing assembly, the bearing assembly comprising:
   a bearing housing; and
   a bearing located within the bearing housing and arranged in use to receive a rotatable shaft;
   wherein the plurality of elongate members couple the bearing to the bearing housing;
   wherein the plurality of elongate members include piezoelectric elements;
   wherein the method comprises actuating the piezoelectric elements so as to exert the force directly on the plurality of elongate members;
   wherein each elongate member has axially extending sides, and the elongate members are oriented such that each side of each elongate member is parallel to a corresponding side of an adjacent elongate member; and
   wherein each of the plurality of elongate members has one of the piezoelectric elements attached on each side.

* * * * *